United States Patent
Vaidya et al.

(10) Patent No.: US 8,433,688 B2
(45) Date of Patent: Apr. 30, 2013

(54) METHOD AND APPARATUS FOR PERFORMING A NEAR-INSTANTANEOUS RESTORE OF A DATABASE

(75) Inventors: Chandrashekhar Madhukar Vaidya, Sugar Land, TX (US); Russel Bruce McDonald, Pflugerville, TX (US); Brett Derek Hawton, Alamo, CA (US)

(73) Assignee: BBS Technologies, Inc., Houston, TX (US)

( * ) Notice: Subject to any disclaimer, the term of this patent is extended or adjusted under 35 U.S.C. 154(b) by 183 days.

(21) Appl. No.: 12/975,035

(22) Filed: Dec. 21, 2010

(65) Prior Publication Data

US 2012/0117033 A1    May 10, 2012

Related U.S. Application Data

(60) Provisional application No. 61/410,133, filed on Nov. 4, 2010.

(51) Int. Cl.
*G06F 7/00* (2006.01)
*G06F 17/00* (2006.01)

(52) U.S. Cl.
USPC .......................................................... 707/679

(58) Field of Classification Search .................... None
See application file for complete search history.

(56) References Cited

U.S. PATENT DOCUMENTS

| 5,832,508 A | * | 11/1998 | Sherman et al. .................. 1/1 |
| 7,836,267 B1 | * | 11/2010 | Cross ............................. 711/162 |
| 2004/0088513 A1 | * | 5/2004 | Biessener et al. ............. 711/173 |

* cited by examiner

*Primary Examiner* — Uyen T. Le
(74) *Attorney, Agent, or Firm* — Park, Vaughan, Fleming & Dowler, LLP; Laxman Sahasrabuddhe

(57) ABSTRACT

Some embodiments provide methods and apparatuses for performing a near-instantaneous restore of a database. During operation, the system intercepts a database management system restore request to restore a database from a backup file to a data file, wherein the backup file comprises a first number (e.g., N1) of data pages. Next, in response to intercepting the database management system restore request, the system sends information to the database management system indicating that the backup file comprises a second number (e.g., N2) of data pages, wherein the second number of data pages is less than the first number of data pages (e.g., N2<N1). Once the database management system has copied the fewer number of data pages from the backup file to the data file, the database management system may indicate that the restore is complete, and continue processing database requests as if the database management system was back online.

24 Claims, 5 Drawing Sheets

METHOD AND APPARATUS FOR PERFORMING A NEAR-INSTANTANEOUS RESTORE OF A DATABASE

RELATED APPLICATION

This application hereby claims priority under 35 U.S.C. §119 to U.S. Provisional Patent Application No. 61/410,133, filed on 4 Nov. 2010, entitled "Method and Apparatus to Perform a Near Instantaneous Restore of an Arbitrarily Large Database in Order to Bring it Rapidly Online and Available for General Transactional Use," by inventors Chandrashekhar Madhukar Vaidya, Russel Bruce McDonald, and Brett Derek Hawton, which is herein incorporated by reference in its entirety.

BACKGROUND

1. Field

This disclosure relates to database management systems. More specifically, this disclosure relates to methods and apparatuses for performing a near-instantaneous restore of a database.

2. Related Art

Modern databases have become very large, often reaching multi-terabytes in size. In the event of a restore from a backup, no matter how much hardware power is available and no matter how fast the I/O subsystem is deployed, the restore can often take tens of minutes, hours, or even days. For organizations that require constant availability database resources, the time taken to perform a restore can result in a loss of revenue, as well as shake the confidence of the organization's customers in the organization's ability to always be available and online for business.

SUMMARY

Some embodiments of the present invention provide methods and apparatuses for performing a near-instantaneous restore of a database. During operation, an embodiment (e.g., a system) can intercept a database management system restore request to restore a database from a backup file. The backup file can comprise a certain number of data pages. In response to the intercepted database management system restore request, the system can send information to the database management system indicating that the backup file comprises fewer data pages than the actual number of data pages in the backup. For example, the actual number of data pages in the backup can be in the millions, and the system may indicate to the database management system that there are only eight data pages in the backup. Once the database management system has copied the fewer number of data pages from the backup file to one or more data files, the database management system may indicate that the restore is complete, and continue processing database requests as if the database management system was back online.

In some embodiments of the present invention, the system can intercept data read and write requests to ensure that database requests are processed properly. Specifically, the system can intercept a database management system read request for a data page in the database. Next, the system can determine if the data page exists in one of the data files. In response to determining that the data page exists in a data file, the system can retrieve the data page from the data file. In response to determining that the data page does not exist in any of the data files, the system can retrieve the data page from the backup file. The system can then return the data page to the database management system.

In some embodiments, the system can use a data map to keep track of whether or not a data page is in one of the data files. Specifically, the system can use an identifier associated with a data page to lookup the data map to determine whether or not the data page exists in one of the data files. The system can intercept a write request to write a data page to a data file. In response to the write request, the system can update the data map to indicate that the data page exists in the data file. The system can then write the second data page to the data file.

In some embodiments of the present invention, sending information to the database management system indicating that the backup file comprises fewer number of data pages can involve retrieving a backup header from the backup file. Next, the system can modify the backup header to indicate that the backup file comprises the fewer number of data pages. Finally, the system can pass the backup header to the database management system so that the database management system indicates that the restore is complete once the database management system has copied the fewer number of data pages from the backup file to one or more data files.

In some embodiments of the present invention, the system asynchronously restores data from the backup file while the database is actively processing transactions, and while maintaining transactional consistency of the database. For example, during the asynchronous restoration, the system can retrieve a data page from the backup file that does not exist in any of the data files. Next, the system can write the data page to a data file and update the data map to indicate that the data page exists in the data file.

In some embodiments of the present invention, once all of the data pages from the backup file exist in the set of data files (e.g., when the asynchronous restoration process is complete), the system can stop intercepting database read and write requests to the database management system.

DETAILED DESCRIPTION

Figure 1:
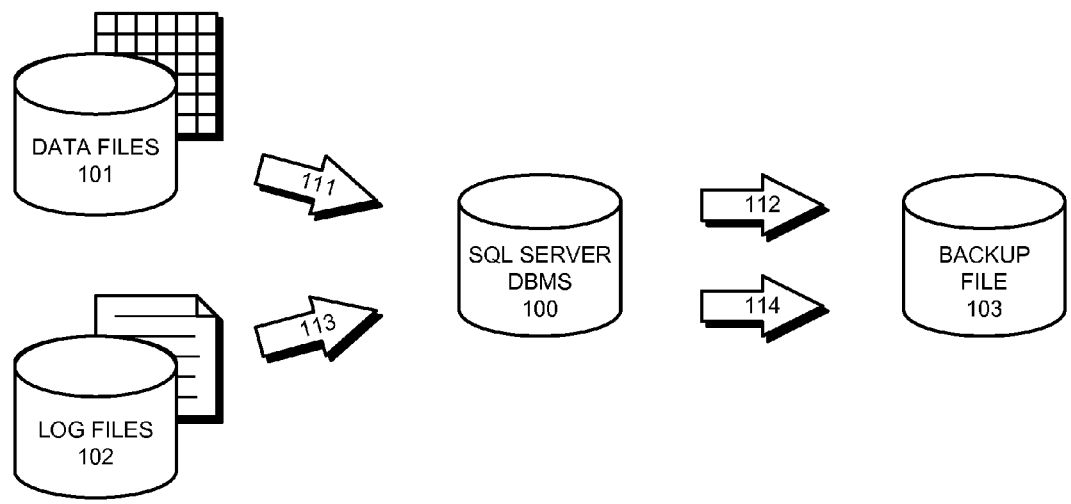
FIG. 1 illustrates a traditional database backup operation.

The following description is presented to enable any person skilled in the art to make and use embodiments of the present invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored on a non-transitory computer-readable storage medium as described above. When a computer system reads and executes the code and/or data stored on the non-transitory computer-readable storage medium, the computer system performs the methods and processes embodied as data structures and code and stored within the non-transitory computer-readable storage medium.

Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Overview

Embodiments of the present invention enable a rapid database recovery to occur with almost zero duration no matter how large the database. This is achieved by tricking the recovery process into essentially skipping the lengthy "copy phase" of the data pages from the backup file to the database data files. The restore then proceeds on to copy the relatively small log records portion of the backup file, and then performs the recovery phase (redo/undo of pending transactions) almost immediately. Hence, the restore is completed rapidly, and the database, with the transactions recovered but with the bulk of the data pages not yet copied from the backup file to the data files, is placed online and ready for general use. The transfer of the rest of the data pages from the backup file to the database data files continues asynchronously while the database remains online and available for general use.

In the event that a transaction executed on the online database requests a data page which has not yet been copied from the backup file to the database data files, embodiments of the present invention utilize a mini-filter driver to intercept the request and preferentially fetch the required page from the backup file and return the fetched page to the database management system which requested it. In order to know if the data page already exists in the database's data files, the mini-filter driver uses a map of data pages that have already been transferred from the backup file to the database data files as well as data pages written by the database management system itself during normal transactional use. Once the asynchronous copy of all remaining data pages from the backup file to the database data files is complete, the filter driver may stop intercepting the calls (e.g., database read and write requests) for data pages. At this point, the mini-filter driver may then be uninstalled if deemed necessary. Alternatively, the mini-filter driver may remain installed in a non-operational state.

Traditional Database Backup Operation

FIG. 1 illustrates a traditional database backup operation. As illustrated in FIG. 1, in a typical database environment, when the SQL Server database management system (DBMS) 100 is instructed to make a full backup of a database, SQL Server DBMS 100 retrieves a copy of the data files 101 containing the data records (operation 111) and saves the data records to backup file 103 (operation 112). Additionally, SQL Server DBMS 100 retrieves a copy of the transaction log files 102 containing the changes made to the data records (operation 113) and saves these changes to backup file 103 (operation 114). Note that data files 101 and transaction log files 102 both comprise one or more files. Note that backup file 103 is typically stored remotely (e.g., at a physically and logically remote location) from the database so that in the event of a catastrophe on the database, a subsequent recovery of the database is still possible.

Note that SQL Server DBMS 100 can include any type of system for storing data in non-volatile storage. This includes, but is not limited to, systems based upon magnetic, optical, or magneto-optical storage devices, as well as storage devices based on flash memory and/or battery-backed up memory. Also note that while the description herein refers to SQL-based database management systems, embodiments of the present invention are generally applicable to any type of database technology.

For the sake of clarity and ease of discourse, the data files, log files, and backup file shown in FIGS. 1-6 use the same set of labels, namely, label "101" for the data files, label "102" for the log files, and label "103" for the backup file. However, the data files, log files, and backup file shown in one figure can be logically and/or physically different from the data files, log files, and backup file shown in another figure.

Traditional Database Restore Operation

Figure 2:
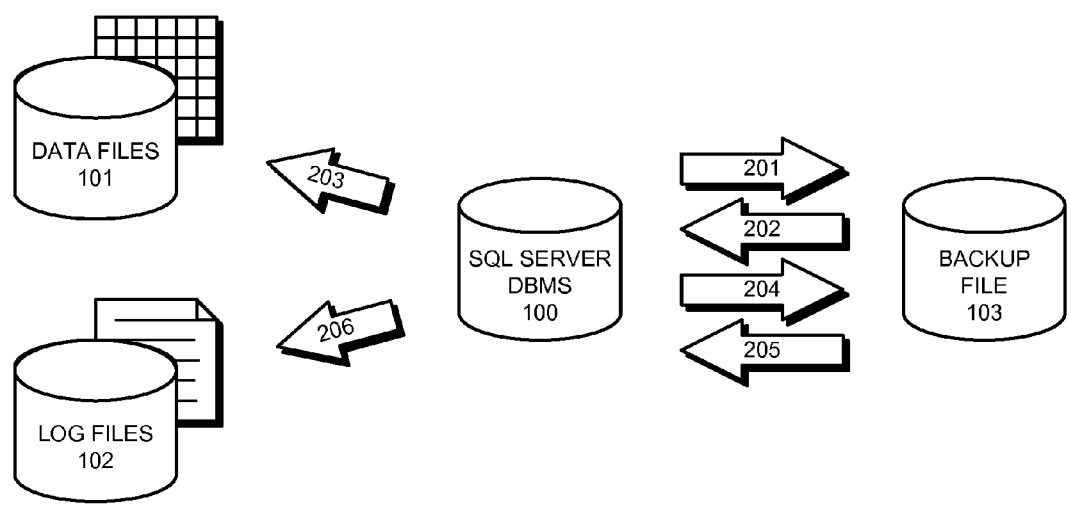
FIG. 2 illustrates a traditional database restore operation.

FIG. 2 illustrates a traditional database restore operation. During a typical restore operation, SQL Server DBMS 100 connects to backup file 103 (operation 201), retrieves the data portion of backup file 103 (operation 202), and copies the data portion of backup file 103 to data files 101 (operation 203). As the data contained in a database could consist of many millions of records, the data portion of backup file 103 can be hundreds of gigabytes, or even terabytes, in size, and hence this copy operation (typically from a remote data store where backup file 103 is kept) can take tens of minutes or even hours to complete. Note that this typically represents the greatest duration of time of the restore operation. Next, SQL Server DBMS 100 connects to backup file 103 (operation 204), retrieves the transaction log portion of backup file 103 (operation 205), and copies the transaction log portion of backup file 103 to transaction log files 102 (operation 206).

Traditional Redo/Undo Phase of a Database Restore Operation

Figure 3:
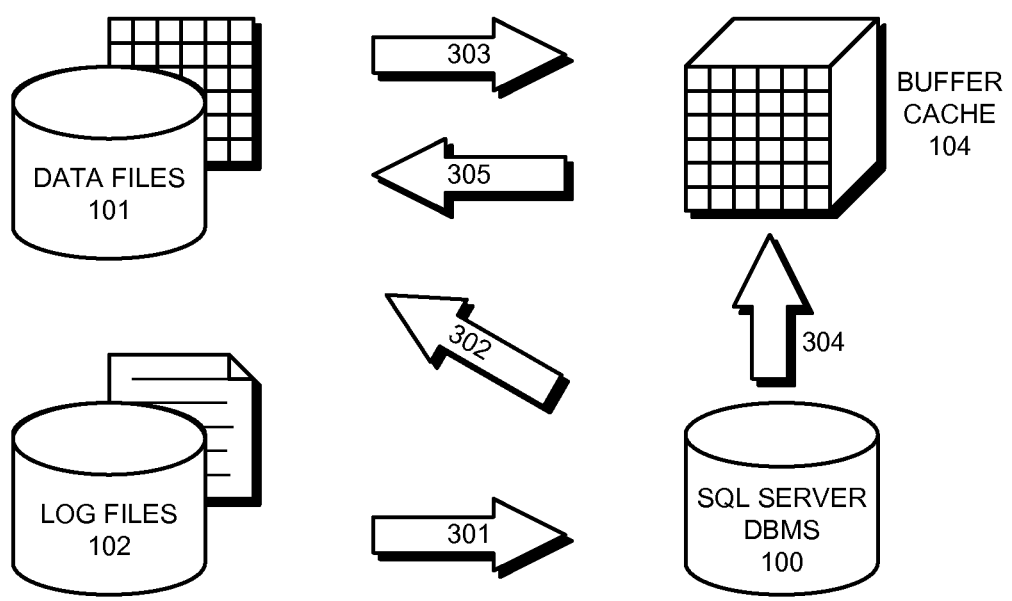
FIG. 3 illustrates a traditional database redo/undo phase during a restore operation.

FIG. 3 illustrates a traditional database redo/undo phase during a restore operation. At this point in the restore operation, SQL Server DBMS 100 performs the "redo" phase by reading the transaction log files 102 (operation 301) and applying the changes in transaction log files 102 to the records in data files 101 (operation 302) in order to roll-forward the data to the recovery point. Typically, the data pages in data files 101 that are to be changed are read into the buffer cache 104 of SQL Server DBMS 100 (operation 303), altered as per the change found in transaction logs 102 (operation 304), and then subsequently re-written back to data files 101 (operation 305).

Next, SQL Server DBMS 100 then performs the "undo" phase that then reverses the changes made by transactions in transaction log files 102 which were busy but did not commit at the point in time that the backup ended. The changes are reversed in data files 101 in the same manner as described above in regards to the redo phase, mirroring operations 301-305.

At this point, the database data pages in data files 101 are now recovered to the point in time that the backup had completed, and the data pages are transactionally consistent with that point in time, and hence, the restore is complete. The database as a whole is now ready for transactional work and is marked "online."

Near Instantaneous Restore

Figure 4:
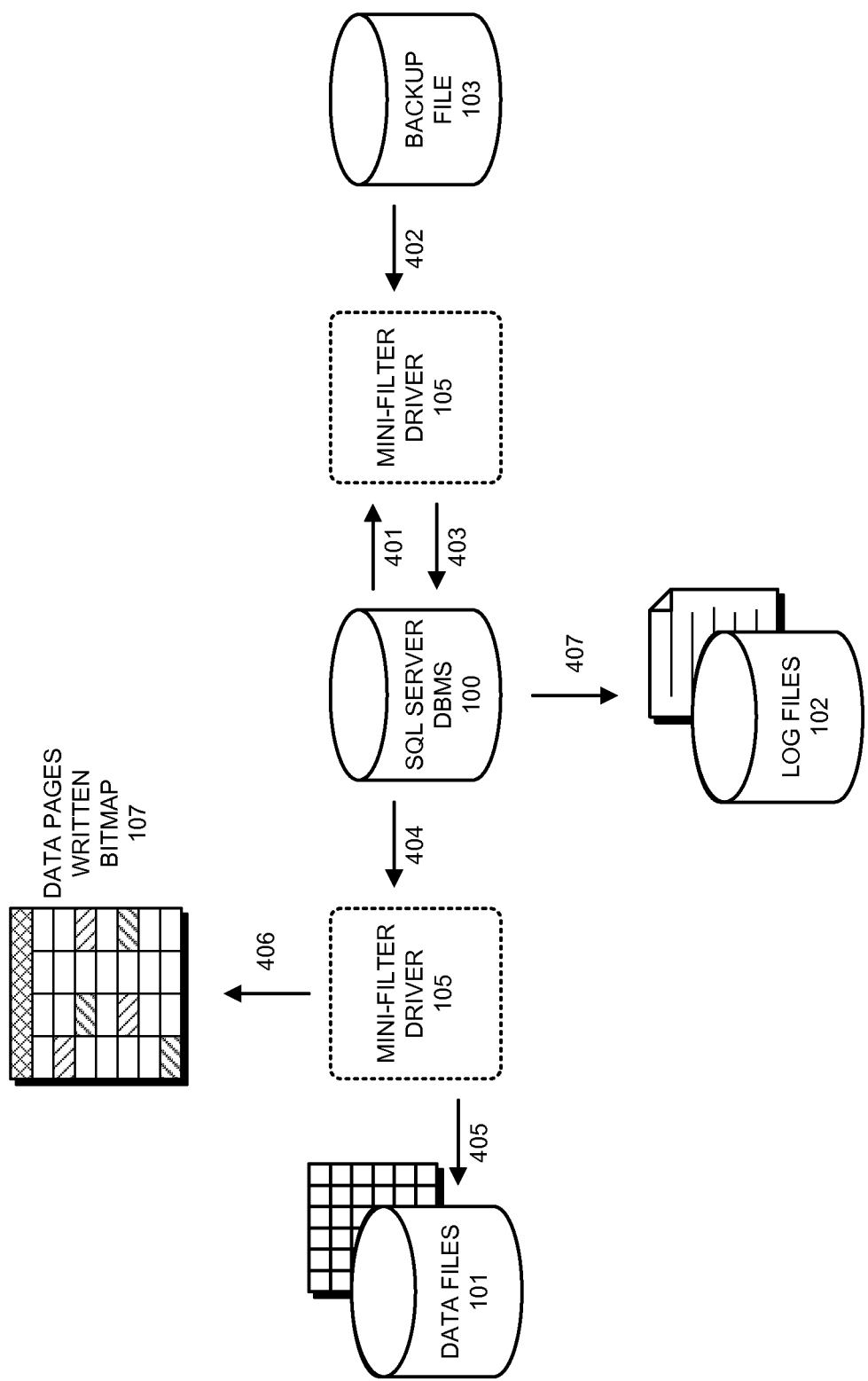
FIG. 4 illustrates a database restore operation in accordance with some embodiments of the present invention.

In contrast to the above-described traditional approach for restoring from a backup file, FIG. 4 illustrates a database restore operation in accordance with some embodiments of the present invention. In response to a restore command being issued, the SQL Server DBMS 100 begins requesting backed-up data pages from backup file 103 in order to copy the pages into the newly created data files 101. These I/O (Input/Output) "copy" requests are intercepted by the mini-filter driver 105 (operation 401). Mini-filter driver 105 then modifies information retrieved from backup file 103 (operation 402), and sends the modified information to SQL Server DBMS 100 (operation 403). SQL Server DBMS 100 then examines the information returned by mini-filter driver 105, which informs SQL Server DBMS 100 that there are just a few data pages in backup file 103 to be restored. SQL Server DBMS 100 accepts this contrived situation and terminates the data file copy phase early (after copying the few data pages referenced in the information). Hence, the copy phase of the data pages from backup file 103 to data files 101 is ended prematurely (and very rapidly) without any significant portion of the data pages actually having being copied.

In one embodiment of the present invention, operation 402 involves the following: in each of the SFIN structures defining the data files contained in backup file 103 at the point in time that the backup started the "backed up page count" field is set to a hard-coded value of 8, and the "file size" field hardcoded to 65,536. Further information of the SFIN structures can be found in the document "Microsoft On-disk Data Structures," (hereafter known as "MODS") which can be obtained from Microsoft Corporation of Redmond, Wash. The SFIN structures defining the transaction log files contained in backup file 103 are not altered in any way. Note that the values described herein are for exemplary purposes only. Embodiments of the present invention are not meant to be limited to these exemplary values.

In the MQDA structure (as defined in "MODS"), in the stream header called MTF_Stream_Hdr, the "Stream Length" field is set to the number of SFIN structures defining the data files multiplied by 65,536, and then 2 is added to the total. In the case of a striped backup, in all subsequent backup files other than the first backup file, the "Stream length" is set to a constant value of 2.

Additionally, the first extent of each data file contained in backup file 103 is located and moved such that all first extents of all of the data files are contiguous to each other. In the case of a striped backup, these first extents may indeed reside in a different stripe; however, they are moved to the first stripe.

Due to the fact that the "Stream length" field has been changed in the MTF_Stream_Hdr (as described above) the checksum of the entire stream header has to be recomputed and the results placed into the "checksum" field. Due to the fact that the value in the "Stream Length" field has been significantly reduced, the offsets in all subsequent structures will need to reflect their "new" derived offsets that will typically be far earlier in backup file 103 as would otherwise be the case.

Hence, in all of the successive SFMB structures (as defined in "MODS") whose "PBA of Previous Filemarks Array" fields contain offsets to structures with new derived offsets, the "PBA of Previous Filemarks Array" field needs to be adjusted to reflect the new offset (typically by the difference between the old and new values in the "Stream length" field). In many cases, these derived offsets need to be boundary aligned (as described in "MODS").

Continuing with the restore process, mini-filter driver 105 intercepts all I/O calls (e.g., read and write requests) to data files 101 and backup file 103. Note that this interception can also be achieved via other means such as detours.

Mini-filter driver 105 intercepts the I/O calls made by the SQL Server DBMS as part of its restore process and the offsets as described above are computed. These computed offsets are then used to read from backup file 103. When the results of the read are returned, changes to the various structures are applied to the data stream by mini-filter driver 105. Once this is complete, the manipulated data stream is then returned to SQL Server DBMS 100 to satisfy SQL Server DBMS 100's original backup file 103 read request.

Any I/O requests issued by SQL Server DBMS 100, requesting file sizes and/or offsets (e.g. IRP_MJ_Query_Information) from backup files 103 are also intercepted by mini-filter driver 105 and the corrected values, as determined above, are applied before the call is returned.

As part of the mini-filter driver 105 interception (operation 404), any writes made by SQL Server DBMS 100 to data files 101 (operation 405) are also intercepted and records of such writes are kept in a persisted "data pages written" bitmap 107 (operation 406).

Additionally, SQL Server DBMS 100 copies the transaction log portion of backup file 103 to one or more transaction log files 102 of the database (operation 407).

Redo/Undo Phase

Figure 5:
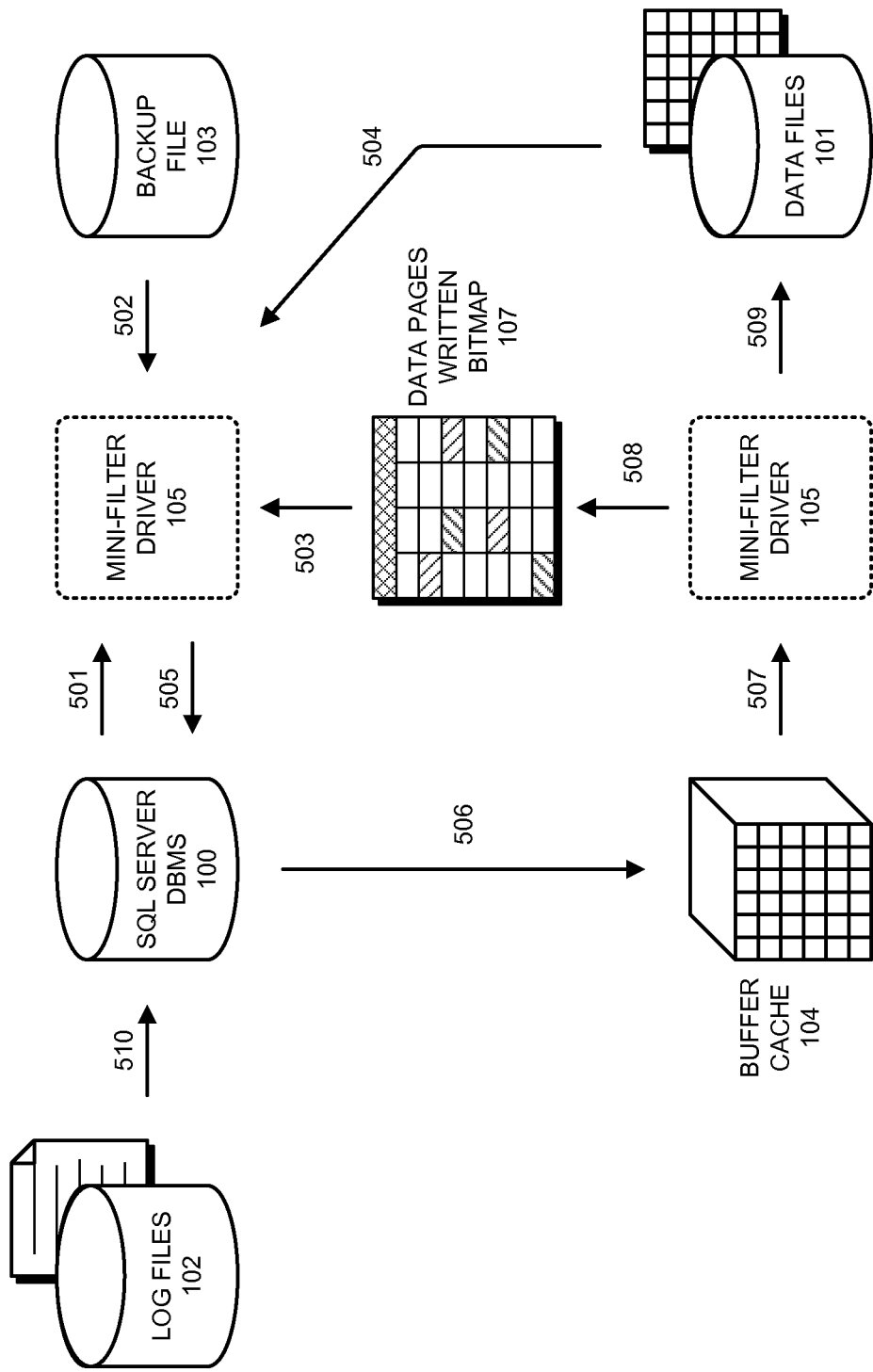
FIG. 5 illustrates a redo/undo operation in accordance with some embodiments of the present invention.

FIG. 5 illustrates a redo/undo operation in accordance with some embodiments of the present invention. As described above, SQL Server DBMS 100 performs the "redo" phase which involves reading changes from log files 102 (operation 510), and applying the changes on transaction log files 102 to the records in data files 101 in order to roll-forward that data to the recovery point. As part of this process, when SQL Server DBMS 100 requests the records in data files 101 (operation 501), mini-filter driver 105 intercepts the calls, and if the pages are not yet in data files 101, mini-filter driver 105 sources the data pages from backup file 103 (operations 502 and 505). Technically, this is achieved by examining the "data pages written" bitmap 107 (operation 503), and depending on if the bit is set or not, the pages requested are sourced either from data files 101 (operations 504 and 505) or from backup file 103 (operations 502 and 505). Any writes to data files 101 are also intercepted, and records of such writes are kept in the same "data pages written" bitmap 107.

As part of the "undo" phase of the restore, SQL Server DBMS 100 then reverses the changes made by transactions in transaction log files 102 to the records in data files 101 which were busy but not committed at the point in time that the backup ended. As part of this process, when SQL Server DBMS 100 requests the records in data files 101 (operation 501), mini-filter driver 105 intercepts the calls and examines "data pages written" bitmap 107 (operation 503), and depending on if the bit is set or not, the pages requested are sourced either from data files 101 (operations 504 and 505) or from backup file 103 (operations 502 and 505). Any writes to data files 101 are also intercepted and record of such writes is kept in the same "data pages written" bitmap 107.

In some embodiments, the system may apply the changes from log files 102 to the relevant data pages stored in buffer cache 104 (operation 506). When the SQL Server DBMS 100 writes one or more updated buffer pages from buffer cache 104 to data files 101, mini-filter driver 105 may intercept the write request (operation 507), update "data pages written"

bitmap 107 (operation 508), and write the updated data page to the data file (operation 509).

At this point, the data pages in data files 101 are now recovered to the point in time when the backup had completed, and are transactionally consistent with that point in time, and hence, the restore is complete. The database as a whole is now ready for transactional work, and is marked "online."

An important difference between the near-instantaneous restore sequence shown in FIGS. 4-5 and the standard restore sequence shown in FIGS. 2-3 is as follows: in the near-instantaneous restore sequence shown in FIGS. 4-5 the lengthy copy process of the data pages is terminated early (i.e., before all of the data pages have been copied from backup file 103 to data files 101) so that normal transactional processing can resume. In some embodiments, at the end of the near-instantaneous restore sequence shown in FIGS. 4-5, the only data pages present in data files 101 are those pages recovered from backup file 103 and altered as part of the "redo" phase and as part of the "undo" phase, as well as the first extents of each data file as described previously. In this manner, embodiments of the present invention complete the restore substantially faster as its data page copy process is terminated early.

Asynchronous Copy

In some embodiments of the present invention, the online database does not yet have all of the data pages in data files 101 as most of the data pages have yet to be copied from backup file 103. These data pages can be copied asynchronously (with the database itself already online and processing transactions normally) as described below.

Figure 6:
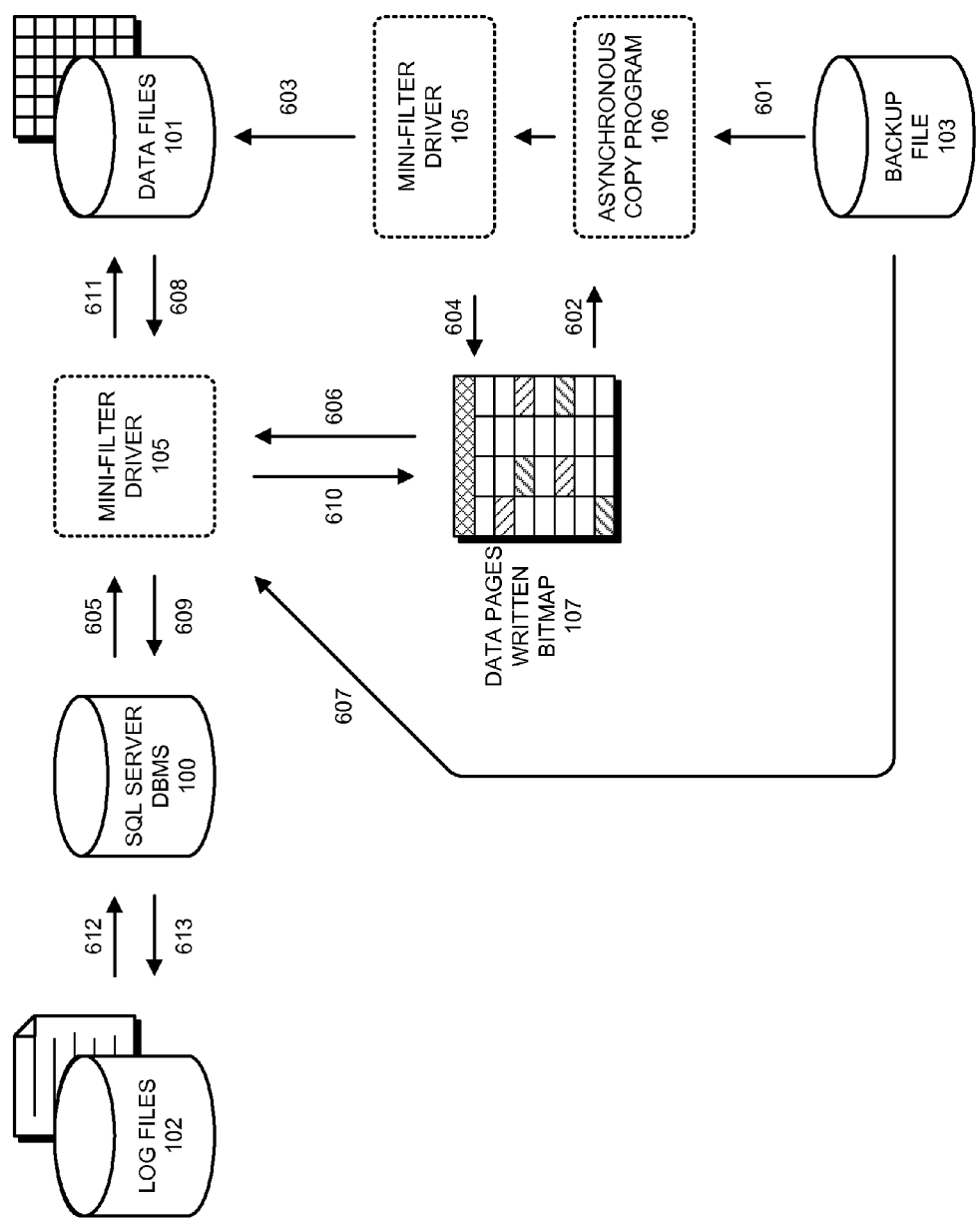
FIG. 6 illustrates an asynchronous copy operation in accordance with some embodiments of the present invention.

FIG. 6 illustrates an asynchronous copy operation in accordance with some embodiments of the present invention. This step asynchronously copies data pages not already copied from backup file 103 to data files 101. In this step, asynchronous copy program 106 sequentially reads backup file 103 (operation 601), and compares the page numbers of the pages which have been read to the contents of "data pages written" bitmap 107 (operation 602). If "data pages written" bitmap 107 indicates that the page number of the data page read from backup file 103 does not already exist in data files 101, then the data page is written to data files 101 (operation 603) and the "data pages written" bitmap 107 is updated accordingly (operation 604). In order to preserve data integrity, locks can be used to prevent the SQL Server DBMS 100 from reading or writing to the same area that the asynchronous copy is currently writing data.

During this period of asynchronous copying, SQL Server DBMS 100 may request pages from data files 101 (operation 605). These requests are intercepted by the mini-filter driver 105, which performs a "lookup" in "data pages written" bitmap 107 (operation 606) to determine if the page is already in data files 101. If not, the data page is sourced from backup file 103 (operations 607 and 609) and "data pages written" bitmap 107 is updated accordingly (operation 610). However, if the data page does indeed exist in data files 101 as indicated by "data pages written" bitmap 107, then the read I/O request is allowed to proceed, i.e., the data page is sourced from data files 101 (operations 608 and 609).

Likewise, during this period of asynchronous copying, SQL Server DBMS 100 may write data to data files 101. Mini-filter driver 105 intercepts these writes, writes the data page to data files 101 (operation 611), and updates "data pages written" bitmap 107 accordingly (operation 610). During the asynchronous copy process, SQL Server DBMS 100 can read and write transactions to log files 102 as required (operations 612 and 613).

Once the asynchronous copy process from backup file 103 to data files 101 is complete, then there are no further reasons for mini-filter driver 105 to intercept further I/O requests, and hence, interception can be stopped. At this point, the mini-filter driver 105 can be uninstalled without affecting SQL Server DBMS 100 or the underlying database and the transactions being executed against it.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method for performing a near-instantaneous restore of a database, the method comprising:
   a filter driver executing on one or more processors intercepting a restore request from a database management system to restore a database from a backup file to a data file, wherein the backup file comprises a first number of data pages;
   the filter driver executing on the one or more processors retrieving a backup header from the backup file;
   the filter driver executing on the one or more processors modifying the backup header to indicate that the backup file comprises a second number of data pages, wherein the second number of data pages is less than the first number of data pages; and
   the filter driver executing on the one or more processors passing the backup header to the database management system so that the database management system indicates that the restore is complete once the database management system has copied the second number of data pages from the backup file to the data file.

2. The computer-implemented method of claim 1, wherein the method further comprises:
   intercepting a database management system read request for a data page in the database;
   determining if the data page exists in the data file;
   in response to determining that the data page exists in the data file, retrieving the data page from the data file;
   in response to determining that the data page does not exist in the data file, retrieving the data page from the backup file; and
   returning the data page to the database management system.

3. The computer-implemented method of claim 2, wherein determining if the data page exists in the data file involves performing a lookup in a data map.

4. The computer-implemented method of claim 3, wherein upon retrieving the data page from the backup file, the method further comprises:
   saving the data page to the data file; and
   updating the data map to indicate that the data page exists in the data file.

5. The computer-implemented method of claim 3, further comprising asynchronously restoring data from the backup file while the database is actively processing transactions, and while maintaining transactional consistency of the database, by:
   retrieving a second data page from the backup file that does not exist in the data file;
   writing the second data page to the data file, wherein writing the second data page to the data file involves temporarily blocking an area to be written in order to guarantee database integrity because the database may simultaneously try to perform a read from, or a write to, the area; and updating the data map to indicate that the second data page exists in the data file.

6. The computer-implemented method of claim 3, further comprising updating the data map to indicate that the second number of data pages exist in the data file.

7. The computer-implemented method of claim 3, further comprising:
 intercepting a write request to write a second data page to the data file;
 updating the data map to indicate that the second data page exists in the data file; and
 writing the second data page to the data file.

8. The computer-implemented method of claim 3, further comprising:
 determining that all of the data pages from the backup file exist in the data file; and
 terminating the interception of calls from the database management system.

9. A non-transitory computer-readable storage medium storing instructions that when executed by a computer cause the computer to perform a method for performing a near-instantaneous restore of a database, the method comprising:
 intercepting a restore request from a database management system to restore a database from a backup file to a data file, wherein the backup file comprises a first number of data pages;
 retrieving a backup header from the backup file;
 modifying the backup header to indicate that the backup file comprises a second number of data pages, wherein the second number of data pages is less than the first number of data pages; and
 passing the backup header to the database management system so that the database management system indicates that the restore is complete once the database management system has copied the second number of data pages from the backup file to the data file.

10. The non-transitory computer-readable storage medium of claim 9, wherein the method further comprises:
 intercepting a database management system read request for a data page in the database;
 determining if the data page exists in the data file;
 in response to determining that the data page exists in the data file, retrieving the data page from the data file;
 in response to determining that the data page does not exist in the data file, retrieving the data page from the backup file; and
 returning the data page to the database management system.

11. The non-transitory computer-readable storage medium of claim 10, wherein determining if the data page exists in the data file involves performing a lookup in a data map.

12. The non-transitory computer-readable storage medium of claim 11, wherein upon retrieving the data page from the backup file, the method further comprises:
 saving the data page to the data file; and
 updating the data map to indicate that the data page exists in the data file.

13. The non-transitory computer-readable storage medium of claim 11, wherein the method further comprises asynchronously restoring data from the backup file while the database is actively processing transactions, and while maintaining transactional consistency of the database, by:
 retrieving a second data page from the backup file that does not exist in the data file;
 writing the second data page to the data file, wherein writing the second data page to the data file involves temporarily blocking an area to be written in order to guarantee database integrity because the database may simultaneously try to perform a read from, or a write to, the area; and
 updating the data map to indicate that the second data page exists in the data file.

14. The non-transitory computer-readable storage medium of claim 11, wherein the method further comprises updating the data map to indicate that the second number of data pages exist in the data file.

15. The non-transitory computer-readable storage medium of claim 11, wherein the method further comprises:
 intercepting a write request to write a second data page to the data file;
 updating the data map to indicate that the second data page exists in the data file; and
 writing the second data page to the data file.

16. The non-transitory computer-readable storage medium of claim 11, wherein the method further comprises:
 determining that all of the data pages from the backup file exist in the data file; and
 terminating the interception of calls from the database management system.

17. A system, comprising:
one or more processors; and
a non-transitory storage medium storing instructions that when executed by the one or more processors cause the system to perform a method for performing a near-instantaneous restore of a database, the method comprising:
 intercepting a restore request from a database management system to restore a database from a backup file to a data file, wherein the backup file comprises a first number of data pages;
 retrieving a backup header from the backup file;
 modifying the backup header to indicate that the backup file comprises a second number of data pages, wherein the second number of data pages is less than the first number of data pages; and
 passing the backup header to the database management system so that the database management system indicates that the restore is complete once the database management system has copied the second number of data pages from the backup file to the data file.

18. The system of claim 17, wherein the method further comprises:
 intercepting a database management system read request for a data page in the database;
 determining if the data page exists in the data file;
 in response to determining that the data page exists in the data file, retrieving the data page from the data file;
 in response to determining that the data page does not exist in the data file, retrieving the data page from the backup file; and
 returning the data page to the database management system.

19. The system of claim 18, wherein determining if the data page exists in the data file involves performing a lookup in a data map.

20. The system of claim 19, wherein upon retrieving the data page from the backup file, the method further comprises:
 saving the data page to the data file; and
 updating the data map to indicate that the data page exists in the data file.

21. The system of claim 19, wherein the method further comprises asynchronously restoring data from the backup file while the database is actively processing transactions, and while maintaining transactional consistency of the database, by:
- retrieving a second data page from the backup file that does not exist in the data file;
- writing the second data page to the data file, wherein writing the second data page to the data file involves temporarily blocking an area to be written in order to guarantee database integrity because the database may simultaneously try to perform a read from, or a write to, the area; and
- updating the data map to indicate that the second data page exists in the data file.

22. The system of claim 19, wherein the method further comprises updating the data map to indicate that the second number of data pages exist in the data file.

23. The system of claim 19, wherein the method further comprises:
- intercepting a write request to write a second data page to the data file;
- updating the data map to indicate that the second data page exists in the data file; and
- writing the second data page to the data file.

24. The system of claim 19, wherein the method further comprises:
- determining that all of the data pages from the backup file exist in the data file; and
- terminating the interception of calls from the database management system.

* * * * *